United States Patent [19]

Meratla

[11] Patent Number: 5,467,722
[45] Date of Patent: Nov. 21, 1995

[54] METHOD AND APPARATUS FOR REMOVING POLLUTANTS FROM FLUE GAS

[76] Inventor: Zoher M. Meratla, 2275 Westhill Drive, West Vancouver, British Columbia, Canada, V7S 2Z2

[21] Appl. No.: 293,297

[22] Filed: Aug. 22, 1994

[51] Int. Cl.$^6$ .................................................. F23J 11/00
[52] U.S. Cl. ........................ 110/345; 110/234; 110/216; 62/7; 62/11; 95/288
[58] Field of Search ................................. 110/212, 210, 110/216, 233, 345, 234; 55/267; 95/288; 34/79, 86; 62/7, 11; 431/11; 60/39.5, 730

[56] References Cited

U.S. PATENT DOCUMENTS 5,133,190  7/1992  Abdelmalek .............................. 60/648
5,321,946  6/1994  Abdelmalek .............................. 60/648

*Primary Examiner*—Denise L. Gromada
*Assistant Examiner*—Susanne C. Tinker
*Attorney, Agent, or Firm*—Griffin, Butler, Whisenhunt & Kurtossy

[57] ABSTRACT

A method for removing gaseous pollutants from a polluted flue gas stream of an oil or coal-fired combustion furnace. A source of liquified combustible gas and a combustible gas-fired furnace are provided. The polluted flue gas stream is passed through a dust removal apparatus and removes flue dust from the flue gas stream so as to provide a de-dusted flue gas stream. Heat is recovered from the flue gas to generate power therefrom. The de-dusted flue gas is compressed to a pressure of at least 10 psi gauge using the generated power to at least in part compress the de-dusted flue gas. The compressed flue gas and the combustible gas are passed through at least one multi-sided heat exchanger, where the compressed flue gas is first passed through one side thereof and the liquified combustible gas in an at least partially vaporized state is passed through another side thereof. The compressed flue gas is cooled sufficiently by the combustible gas that water and at least one gaseous pollutant of $NO_2$, $SO_2$ and $CO_2$ are condensed and separated from the compressed flue gas to provide reduced pollutant flue gas. Fully vaporized combustible gas is passed to the combustible gas-fired furnace and combusted to a further flue gas and the further flue gas is passed into the polluted flue gas stream.

42 Claims, 4 Drawing Sheets

METHOD AND APPARATUS FOR REMOVING POLLUTANTS FROM FLUE GAS

The present invention relates to a method and apparatus for removing gaseous pollutants from a polluted flue gas stream, and particularly to such polluted flue gas stream emanating from an oil or coal-fired combustion furnace, and more particularly to such method and apparatus using cryogenic treatment of the flue gas.

BACKGROUND OF THE INVENTION

As is well known, emissions control of flue gases is one of the more challenging problems in preventing environmental deterioration, and a wide range of efforts have been made toward decreasing harmful emissions in flue gases, particularly, nitrogen oxides, sulfur oxides and carbon dioxide. These emissions are particularly troublesome in connection with oil or coal-fired combustion furnaces, e.g. those furnaces used by power plants for generating electricity, heating plants for generating a sensible heat for building control, and power plants for powering industrial processes and factories. Most of the effort in the art has been toward that of wet or dry scrubbing the flue gases to remove, essentially, the acid-causing compounds contained in the flue gases, in order to mitigate consequential formation of acid rain. Some of these scrubbing processes have created new waste disposal problems, in and of themselves, and beyond that, those scrubbing processes are relatively ineffective in simultaneously removing other common pollutants from such flue gases, such as nitrogen and sulfur oxides.

Further, of increasing concern is the large amount of carbon dioxide contained in such flue gases, since evidence is now being generated that increased quantities of carbon dioxide expelled into the atmosphere with such flue gases contribute to the perceived global warming. Conventional processes, e.g. scrubbing processes, are not capable of removing substantial quantities of carbon dioxide, in view of the low solubility thereof in most scrubbing materials, and, therefore, typical flue gas emissions, at present, contain large amounts of carbon dioxide.

Usual scrubbing processes are also relatively inefficient in removing nitrogen dioxide and sulfur dioxide, as well as other pollutants such as unburned fuel and carbon monoxide. As a result, the scrubbed flue gases still contain considerable amounts of such pollutants, which not only continue to degrade the environment, but also necessitate the use of so-called "high" stacks for dispersal of the flue gases into the atmosphere. In this latter regard, a so-called "high" stack is required such that the exit of the still polluted flue gases from the stack is sufficiently high above ground that under usual atmospheric conditions, those flue gases will move upwardly into the atmosphere and away from populated areas near the stack. This is opposed to the so-called "low" stacks, which are much shorter than the "high" stacks, which "low" stacks are appropriate only for emissions of gases with quite low levels of pollutants, particularly where those pollutants are of such low level that they may be dispersed near the ground in populated areas without causing harm to either the population or the environment. Those high stacks, in turn, require considerable buoyancy of the flue gases, in order that the flue gases will move upwardly in the "high" stacks and be dispersed upwardly into the atmosphere. That buoyancy is obtained by keeping the flue gases in the stacks relatively hot, and, therefore, that heat energy in the flue gases cannot be extracted for other purposes.

In view of these considerable deficiencies in the usual scrubbing-type means for removing pollutants, the art has made a considerable effort to provide improved processes and apparatus for removing gaseous pollutants from polluted flue gas streams. These efforts have ranged widely in technical principle. Thus, for example, U.S. Pat. No. 4,988,490 suggests an absorptive process, especially that of using pressure swing absorption for removal of pollutants.

It is well known that the gaseous pollutants in flue gas can be condensed or frozen with sufficient cooling and pressure, of the flue gas, and the condensed or frozen gaseous pollutants can, therefore, be separated from the flue gas. In U.S. Pat. No. 4,513,573, a process is described where flue gas from a steam generating power plant is separated into condensable and non-condensable components by freezing the flue gas. In a specific embodiment of that patent, the combustion chamber of the power plant is maintained under sufficiently high pressure so as to avoid the need for additional downstream compression of the flue gas to cause condensation. The frozen components are recovered and, through sublimation and vaporization, are processed for reuse in other industries. The use of a high pressure combustion chamber, however, causes considerable technical problems and cannot be widely adopted.

A little different approach from that of the foregoing patent is described in U.S. Pat. No. 5,205,843, where the gas stream is treated for removal of pollutants using a combination of membrane separation and condensation, and a similar approach is also described in U.S. Pat. No. 5,089,033.

These processes which depend, at least in part, on condensation or freezing of the pollutants by lowering the temperature of the flue gas, are generally referred to in the art as cryogenic separation processes, although that term is not meant to imply a specific minimum reduced temperature, but simply the cooling of the flue gas until condensation or freezing of the separate pollutants occur, which cooling may or may not be with pressurization of the flue gas.

The difficulty with such cryogenic separation is also well known in the art. Thus, the pressure of flue gas from the usual furnace is very low and, therefore, does not lend itself to separating pollutants by condensation without significant compression and without considerably lowering the temperature of the flue gas. Because of the large flow of flue gas from power plants and other combustion process plants, the required compression horse power, alone, can be quite high. In U.S. Department of Energy Report No. ER-30194, a Research Needs Assessment on Carbon Dioxide from Fossil Fired Power Plants, estimates an energy penalty of 55% to remove carbon dioxide by cryogenic means from coal-fired power plants. This estimate, however, does not account for the energy penalty in concomitant cooling of the flue gas or the removal of nitrogen oxides and sulfur oxides.

In this latter regard, the concentration of components of flue gas, such as nitrogen oxides and sulfur oxides, is very low and, hence, their partial pressures are very low, requiring considerable energy in the form of cooling or pressure for adequate condensation thereof. Thus, cryogenic separation of pollutants from flue gases would seem to be a very unattractive approach for removal of pollutants from those flue gases, in view of the serious energy penalty involved.

It would, therefore, be of considerable advantage to the art to provide method and apparatus for removal of gaseous pollutants from a polluted flue gas stream from an oil or coal-fired combustion furnace by cryogenic means, which is capable of very substantially reducing the amount of pollutants in the flue gas stream, as opposed to the more conventional approaches in the art, as explained above, but where the cryogenic means does not engender the very serious energy penalty discussed above.

SUMMARY OF THE INVENTION

The present invention is based on several primary discoveries and several subsidiary discoveries. As a first primary discovery, it was found that liquified combustible gases, most particularly liquified natural gas, have sufficient heats of vaporization that upon vaporization of those liquified gases, substantial cooling capacity can be achieved for cooling the polluted flue gas stream sufficiently to allow condensation or freezing of the pollutants in that stream with only moderate pressurization of that stream, and, hence, low energy input.

However, as can be easily appreciated, compressing and cooling a combustible gas, such as natural gas, sufficient to liquify the same, e.g. to temperatures in the range of about −235° F. or lower, would require considerable energy expenditures, and, thus, the serious energy penalty would be incurred in such liquification. However, as a further subsidiary discovery, it was found that there are a number of applications of power plants, e.g. electrical generating plants, which have no readily available source of energy, e.g. oil, coal, liquified combustion gases, etc., and in those plants, it is quite common to transport over long distances the fuel for those plants, including liquified combustion gases, and most especially liquified natural gas. Thus, in those plants where liquified combustion gases are normally available for alternate fuels to the plants, the use of the liquified combustion gases for cryogenic separation of pollutants from the flue gases of the plant becomes quite energy efficient, and, hence, economical.

As another primary discovery, it was found that after the flue gas from an oil or coal-fired combustion furnace is first de-dusted (a usual process where particulate matter is removed), ordinary compressors, either centrifugal or piston/cylinder compressors, can be very adequately used for compressing the flue gas sufficiently, i.e. at relatively low pressures, that pollutants can be easily condensed from or frozen out of the flue gas stream when cooled to the very low temperatures achievable by liquified combustion gases. Thus, pressures of flue gas as low as 10 psi gauge are capable of achieving substantial condensation or freezing of the pollutants, at those low temperatures.

As a subsidiary discovery, it was found that the power required to provide this pressurization of the flue gas may be obtained from waste heat recovered from the polluted flue gas, whereas, previously, this waste heat could not be recovered, since it was required to give buoyancy of the flue gas when discharged to the atmosphere through "high" stacks.

As a subsidiary discovery, it was found that if the compressed flue gas and vaporizing or vaporized liquified combustion gas are passed through at least one multi-sided heat exchanger, wherein the compressed flue gas is first passed through one side thereof and the cold combustible gas is passed through another side thereof, the compressed flue gas is cooled in such heat exchanger sufficiently by the cold combustible gas that most of the residual water vapor contained in the flue gas can be easily condensed and removed from the flue gas. The remaining traces of water vapor may be removed by using conventional dry or wet water moisture removal techniques. With such removal of the water vapor from the flue gas, then subsequent cooling in a heat exchanger by this method can allow either condensation or freezing of the pollutants in the flue gas or serial condensation or freezing of the pollutants in the flue gas. In either case, the condensation or freezing and removal of the pollutants, e.g. $NO_2$, $SO_2$, and $CO_2$, allow separation from the compressed flue gas to provide reduced pollutant flue gas.

As a further primary discovery, it was found that the vaporized combustible gas used for cooling the flue gas in the separation of the pollutants can then be supplied, in the vapor form, to a combustible gas-fired furnace for fueling thereof. That combustible gas-fired furnace, therefore, functions to provide additional energy to the power plant involved, and the further flue gas from the combustible gas-fired furnace may then be passed into the polluted flue gas stream of the oil or coal-fired furnace for complete cleaning thereof in the same manner as described above.

Thus, by using the combination of an oil or coal-fired combustion furnace and a combustible gas-fired furnace, where liquified combustible gas used to fire the combustible gas-fired furnace is vaporized and pass through a heat exchanger with the polluted flue gas stream from the oil or coal-fired combustion furnace, not only are the pollutants in the polluted flue gas stream substantially reduced (much greater than that available by prior art techniques), but there is essentially no energy penalty in that situation for such cryogenic separation of the pollutants from the polluted flue gas stream.

Thus, briefly stated, the invention provides a method for removing gaseous pollutants from a polluted flue gas stream of an oil or coal-fired combustion furnace. The method comprises providing a source of liquified combustible gas, providing a combustible gas-fired furnace, passing the polluted flue gas stream through a dust removal means for removing flue dust from the flue gas stream so as to provided a de-dusted flue gas, recovering heat from the flue gas to generate power therefrom and compressing the de-dusted flue gas to a pressure of at least 10 psi gauge using the generated power to at least in part compress the de-dusted flue gas. The compressed flue gas and the combustible gas are then passed in counter-current flow through at least one multi-sided heat exchanger, where the compressed flue gas is first passed through one side thereof and the liquified combustible gas in at least a partially vaporized state is passed through another side thereof. By this arrangement, the compressed flue gas is cooled sufficiently by the combustible gas that water and at least one gaseous pollutant selected from the group consisting of $NO_2$, $SO_2$ and $CO_2$ are condensed (and/or frozen) from the compressed flue gas and separated from the compressed flue gas to provide reduced pollutant flue gas. Fully vaporized combustible gas (gas exiting from a last of the at least one heat exchanger) is passed to a combustible gas-fired furnace and combusted therein (so as to produce additional energy for the plant involved) and the further flue gas from the combustible gas-fired furnace is passed into the polluted flue gas stream from the oil or gas-fired furnace for final cleanup of the further flue gas in the same process for cleanup of the polluted flue gas from the oil or gas-fired furnace.

In addition, an apparatus is provided for removing gaseous pollutants from a polluted flue gas stream of an oil or gas-fired combustion furnace. The apparatus comprises a source of liquid combustible gas, a combustible gas-fired furnace, dust removal means for removing flue dust from the flue gas stream so as to provide a de-dusted flue gas stream. A heat recovery unit is provided for recovering heat from the flue gas to generate power. A compressor means for compressing the de-dusted flue gas to a pressure of at least 10 psi gauge using power generated by the heat recovery unit to at least in part compress the de-dusted gas is also provided, and there is at least one multi-sided heat exchanger. A first flow means for flowing the compressed flue gas and liquified combustible gas in an at least partially vaporized state through the heat exchanger is such that the compressed flue gas is first passed through one side of the heat exchanger and the liquified combustible gas is passed in a counter-current flow through and at least partially vaporized in another side of the heat exchanger. Thus, the compressed flue gas is cooled sufficiently by the vaporized or vaporizing combustible gas that water and at least one gaseous pollutant selected from the group consisting of $NO_2$, $SO_2$ and $CO_2$ are condensed (and/or frozen) from the compressed flue gas and separated from the compressed flue gas to provide reduced pollutant flue gas. An injection means is provided for injecting fully vaporized combustible gas into the combustion gas-fired furnace for combustion thereof to a further flue gas. A second flow means is provided for flowing the further flue gas into the polluted flue gas stream of the oil or coal-fired combustion furnace.

DETAILED DESCRIPTION OF EMBODIMENTS OF THE INVENTION

Figure 1:
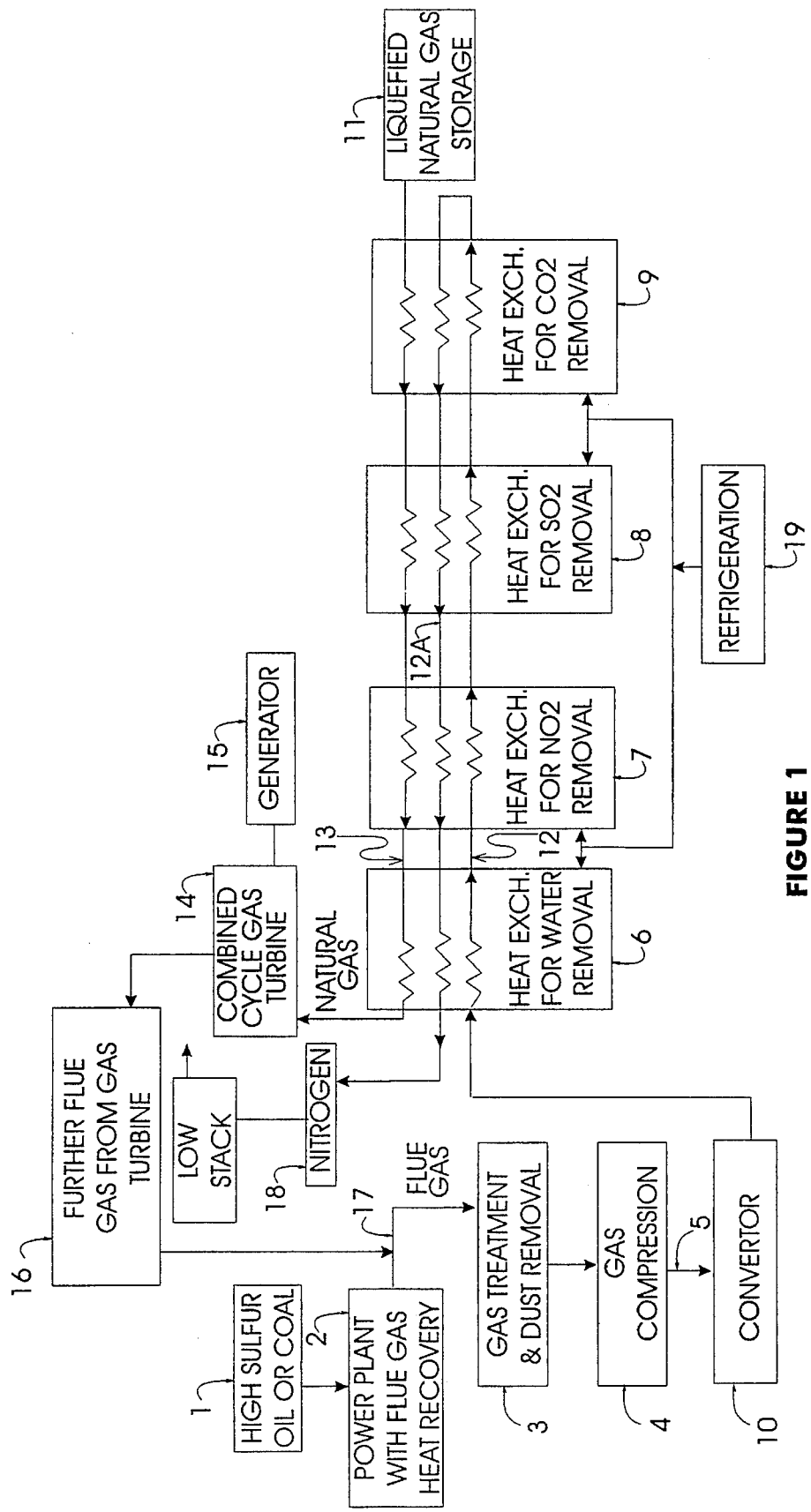
FIG. 1 is a schematic diagram, in block form, of the basic steps and apparatus of the invention.

FIG. 1 is a block diagram of the basic steps of the present process with illustration of the basic apparatus components. As shown in FIG. 1, the fuel 1 (usually high sulfur oil or coal) for a conventional combustion furnace, e.g. for a conventional power plant 2, which may include flue gas heat recovery apparatus, is by the very nature of the fuel a high pollutant fuel, especially in connection with certain oils and coals. When such fuels 1 are combusted in a conventional combustion furnace 2, the flue gas contains water, mixed nitrogenous compounds (referred to as $NO_x$), mixed sulfurous compounds (referred to as $SO_x$), carbon oxides (referred to as $CO_x$), unburned fuel, especially in connection with oil-fired furnaces, combustion particulate matter (referred to as flue dust), and carbon dioxide, as well as a host of other minor components.

The flue gas from such conventional oil or coal-fired combustion furnace 2 is normally treated in a gas treatment and dust removal device 3 for dust removal. A wide variety of such dust removal devices are known to the art, and include devices ranging from baghouse filters to Contrell precipitators, as well as almost any device thereinbetween, such as cyclone separators, water scrubbers, and the like. The particular dust removal means used with the present invention is not critical, and may be any of the conventional dust removal devices. The amount of dust removed is not critical and may be the conventional amounts removed, i.e. the devices remove sufficient dust from the flue gas that the flue gas can be compressed by a conventional compressor, as explained in more detail below, without the amount of dust in the flue gas adversely affecting either the operation or longevity of the compressor itself or clogging the heat exchanger(s). The conventional step of removing the dust from the flue gas is, primarily, a means of protecting the compressor and heat exchanger(s) used according to the present invention, although, ultimately, in any pollutant decreasing method or apparatus, the flue gas dust must be substantially removed for obvious reasons. Thus, any of those conventional dust removal means may be used with the present invention, but, preferably, the dust removal means is at least one of a cyclone separator or a Contrell precipitator or a conventional wet scrubber or a conventional dry scrubber. All of these dust removal means are well known to the art and need not be described herein for sake of conciseness.

After the flue gas passes through dust removal device 3, the de-dusted flue gas is passed to a conventional gas compressor 4 for compressing the de-dusted flue gas to a pressure of at least 10 psi gauge. This is, of course, a very low minimum pressure, and a pressure so low that it would not be normally expected as satisfactory for low temperature removal of pollutants, but, in view of the lower temperatures which can be achieved in the flue gas by virtue of vaporization of the liquified combustion gas, as explained in more detail below, the present process and apparatus can be operated at very moderate pressures, as opposed to usual cryogenic systems, and this is a decided advantage of the present invention.

While the pressure of the compressed gas will vary depending upon the particular flue gas and the particular pollutants therein, as well as the degree of removal of such pollutants that might be required, generally speaking, under almost all such conditions, the pressure of the de-dusted flue gas need not exceed about 400 psi gauge, which is, still, a very moderate pressure. Indeed, for most applications, that pressure can be between about 20 and 150 psi gauge, and for many applications, it can be between about 30 and 100 psi gauge.

After the flue gas is so pressurized, the compressed flue gas is passed via line 5 to at least one multi-sided heat exchanger 6. While only one heat exchanger may be used in the present process and apparatus, that means that all of the pollutants, including the water removed from the gas stream, will be separated in a single heat exchanger, and, therefore, separate removal and recovery of the pollutants would not be practical from an economic point of view. Some of the removed pollutants are valuable by-products, when recovered in substantially pure form, and, for that reason, it is preferred to use a series of heat exchangers, i.e. heat exchangers 6, 7, 8 and 9, for removing, separately, water, $NO_2$, $SO_2$ and $CO_2$. While the removed water will be largely a waste product, the $NO_2$, $SO_2$ and $CO_2$ have commercial value, and the sale thereof can be used to reduce the costs of operating the process or apparatus for removing the pollutants from the flue gas. For example, the $CO_2$ can be reacted with hydrogen, in a known process, for producing methanol.

It will also be appreciated that depending upon the particular conventional oil or gas-fired furnace, the efficiency of combustion thereof, the fuel input thereto, and the like, the flue gas exiting that conventional furnace may not have the nitrogen, sulfur and carbon in the dioxide form, e.g. $NO_2$, $SO_2$ and $CO_2$, but might be in the $NO_x$, $SO_x$, and $CO_x$ form, where x can be 1 or 2 (and numbers thereinbetween for certain conditions). In such cases, it is preferred that the polluted flue gas stream is first passed through a conventional convertor 10, which converts the oxides in the polluted flue gas to the dioxides, e.g. $NO_x$ to $NO_2$ and $SO_x$ to $S_2$, etc. While FIG. 1 shows the convertor 10 between the gas compressor 4 and the first heat exchanger 6, the convertor 10 need not be in that position, but could be between the conventional gas treatment and dust removal device 3 and the conventional gas compressor 4 or even after the conventional power plant with flue gas recovery unit, e.g. furnace 2 and before dust removal device 3.

As also shown in FIG. 1, the liquified combustible gas 11 is liquified natural gas. The liquified combustible gas could be any combustible gas, since the particular combustible gas is not critical to the invention, e.g. the more usual liquified combustible gases, such as alkanes of up to 5 carbon atoms, such as methane, ethane, propane, ethylene, propylene, etc. However, these are not economically practical combustible gases, since they are not readily available in liquified form. Hence, the economically practical, and exemplified gas herein, is liquified natural gas, with the exception shown in FIG. 3 and discussed below.

It will also be noted in FIG. 1 that as the compressed flue gas is first passed through one side of the heat exchanger 6 or heat exchangers 6 through 9, the liquified combustible gas (LNG) is passed through the multi-sided heat exchanger on another side thereof (the liquified combustible gas and the flue gas are separated by appropriate means in the heat exchanger(s)) in a counter-current flow, and sufficient cooling of the compressed gas takes place by the vaporized or vaporizing liquified combustible gas that the gaseous pollutants in the flue gas commence to condense in the heat exchanger(s). In this latter regard, it will be appreciated that, especially when multiple heat exchangers are used, the combustible gas may enter a first heat exchanger in the liquid state, or the vaporized state or a mixture thereof. However, as the combustible gas passes through further heat exchangers, it will be more and more in the vaporized state.

As also seen in FIG. 1, the first passed compressed flue gas 12 and the liquified combustible gas 13 are passed through the at least one heat exchanger in counter-current flow direction. The second passed compressed flue gas 12A, as explained more fully hereinbelow, is also in a counter-current flow direction to the first passed flue gas 12 so as to recover the energy before it is vented to the atmosphere or other uses.

By use of such counter-current flows, a series of heat exchangers, e.g. 6 through 9, can be provided with appropriate temperatures for sequentially condensing or freezing, and thus separating, the pollutants. As shown in FIG. 1, with the arrangement therein, the water vapor of the flue gas first condenses in heat exchanger 6 and is separated from the flue gas. By so removing the water vapor from the flue gas, not only does this make possible the separation of relatively pure pollutants, but, in addition, allows extraction of more heat from the flue gas by vaporization of the liquified combustible gas and allows such temperature control as to very precisely separate the pollutants in recoverable form. Thus, as shown in FIG. 1, after the water vapor is condensed and separated, serially, $NO_2$, $SO_2$ and $CO_2$ are condensed or frozen, depending on the pressure of the compressed flue gas, and separated from the compressed flue gas to provide the reduced pollutant flue gas.

The vaporized combustible gas (LNG) 13 is then passed to a combustible gas-fired furnace 14, exemplified in the drawing as a combined cycled gas turbine. While any combustible gas-fired furnace may be used, a conventional combustible gas-fired gas turbine is preferred, since such a turbine can produce, as an optional feature, power, e.g. electricity, by turning a conventional generator 15. The power produced by such generator 15 can, therefore, be used for powering the apparatus or for other uses, and especially for powering the compression of the flue gas by gas compressor 4. In this regard, it is more preferable that the gas turbine is a conventional combined cycle gas turbine because of the flexibility provided, as is well known in the art and as explained hereinbelow.

The combustible gas fired in the combustible gas-fired furnace 14 produces a further flue gas 16 which is passed into the polluted flue gas stream 17 for co-processing with that polluted flue gas stream, in the manner described above. However, since the further flue gas will be the combustion products of a liquified combustible gas, i.e. liquified natural gas, that further flue gas will be relatively pollutant free, i.e. will not contain sulfur or other compounds of that nature, and will be composed, mainly, of nitrogenous oxides, carbon monoxide (to a small degree), carbon dioxide, some small amount of particulate matter, and water. Thus, this further flue gas contributes very little pollutants to the polluted flue gas stream and, therefore, can be easily processed therewith.

Turning back to the heat exchangers, as noted above, the preferred embodiment is where there are a plurality of heat exchangers in series, as shown in FIG. 1, and the first of the heat exchangers 6 condenses and removes water from the compressed gas 12. In turn, the second heat exchanger 7 condenses or freezes and removes $NO_2$ from the compressed gas 12, and, likewise, the third heat exchanger 8 condenses or freezes and removes $SO_2$ from the compressed gas 12. The fourth heat exchanger 9 condenses or freezes and removes $CO_2$ from the compressed gas 12.

Further, as briefly noted above, and preferably, the flue gas passing through the last of the plurality of heat exchanges, e.g. heat exchanger 9, is recycled in the form of recycled compressed gas 12A through a further side of the heat exchanger(s) 6–9 in a counter-current flow with the first passed compressed gas 12 to recover the energy expended to cool stream 12A.

By the arrangement thus described, and particularly in connection with the above-described preferred embodiments, the compressed gas which exits the last of the plurality of heat exchangers to contact the compressed gas (heat exchanger 6 in FIG. 1 via the recycled compressed gas 12A) contains substantially only nitrogen gas, as indicated in FIG. 1 by numeral 18. The compressed gas exiting from that last of the plurality of heat exchangers contacted by the compressed gas is substantially nitrogen at ambient temperatures and can be simply passed to the atmosphere, since the ambient nitrogen has no substantial amount of further recoverable energy and is essentially a non-polluting gas.

However, with the present invention, since the exiting compressed gas is non-polluting, that exiting gas may be exited to the atmosphere through a so-called "low" stack, as shown in FIG. 1, as opposed to a so-called "high" stack, which is necessary for exiting polluted gases to the atmosphere. In this latter regard, the "high" stack is required for polluted gases, since those polluted gases must be expelled into the upper atmosphere and prevented from drifting toward the ground where populations may encounter those polluted gases. In order to achieve a movement of the polluted gases toward the upper atmosphere, those polluted gases must be expelled from a "high" stack, e.g. at least 100 feet high, which mitigates the effects of lower ground winds and atmospheric conditions, and those polluted gases must be maintained at a fairly high temperature, e.g. 150° F. or higher, in order to provide buoyancy thereto such that the polluted gases will rise to the upper atmosphere, rather than fall to the ground and contact the population thereabout. With the present invention, however, since the exit gas is essentially nitrogen and, therefore, is non-polluting, a "low" flue stack, e.g. less than 100 feet high, may be used. In addition, since the exiting gas is substantially non-polluting nitrogen, heat is removed from the compressed gas upstream by means of a conventional heat transfer described above, and the cooled gas exits the "low" stack is at about ambient temperature. That recovered heat can be used for powering the process or apparatus or otherwise, since the volume of exiting nitrogen is high, as opposed to the prohibition of removing such heat from polluted gases in a high stack, which would destroy the necessary buoyancy thereof.

The removed $NO_2$, $SO_2$ and $CO_2$ can be recovered for sale or other uses, since, with the above arrangement, those compounds are recovered in relatively pure form. The final recovery can be as a liquid, or with appropriate temperatures, for example, the carbon dioxide can be recovered in frozen or blocked form, and this is a distinct advantage of the invention in that those recovered compounds have commercial value.

Depending upon the particular fuel to the oil or coal-fired combustion furnace, the efficiency of that furnace, the particular liquified natural gas, and the efficiency of the heat exchanger or heat exchangers, the amount of cooling effected by the vaporization of the liquified natural gas may not be sufficient for the necessary cooling of the compressed gas to achieve separation of the pollutants, as described above. In those cases, it may be necessary to supplement that cooling of the liquified natural gas by further cooling the compressed gas prior to or during passage through the heat exchangers by an open or closed cycled refrigeration system, generally indicated in FIG. 1 by reference numeral 19. Any conventional refrigeration may be used in this regard, e.g. evaporative coolers, gas coolers, mechanical refrigeration and the like, but most often such additional refrigeration will not be required.

In the above description of the process, the liquified combustible gas is described as vaporizing in the heat exchangers. However, it will be easily appreciated by those skilled in the art, that the vaporization need not take place in the heat exchangers themselves when the requirements for cooling of the particular polluted flue gas are low. For example, in a ship, which normally used coal or oil as fuel for the power plant, more usually the latter, that power plant produces relatively low amounts of flue gas and, hence, pollutants. Therefore, the requirement for cooling of the flue gas for removal of pollutants, as described above, is relatively low. In some ships, liquified natural gas is sometimes carried as cargo. For such low amounts of required cooling, the normal boil off of the liquified natural gas, i.e. vaporized liquified natural gas, will be quite sufficient for cooling needs in removing pollutants from the flue gas. Thus, the liquid form of the natural gas need not be passed through the heat exchangers, and only the usual or normal boil off vapors of the liquified natural gas are quite adequate for that cooling (the vapors will be near a temperature equilibrium with the liquified natural gas, e.g. about $-235°$ F.). This is, therefore, specifically noted herein as an equivalent to the above description of the liquified natural gas vaporizing in the heat exchanger, in such particular cases, and the specification and following claims should be so construed.

Also, while the above description of the invention references, specifically, oil and coal fuels, those skilled in the art will clearly understand that those terms are not limited to those specifically exemplified fuels, and that, therefore, the invention is applicable to a wide variety of fuels of that nature, e.g. fuel oil, diesel oil, bunker oil, shale oil, powdered coal, coal gas, and the like, and the above terms of oil and coal are intended to embrace these forms of such fuels, as is well known in the art.

However, in connection with vaporization of the liquified natural gas, from the above description, it will easily be seen that, ultimately, the liquified natural gas must be converted into the gaseous state in order to be burned in the combustible gas-fired furnace, i.e. the liquified combustible gas is completely vaporized and ultimately warmed to near ambient temperature. In the process described above, the combustible gas is substantially completely vaporized and warmed while passing through the heat exchanger(s).

While the apparatus of the invention is generally described above, more specifically, the apparatus provided by the present invention is for removing gaseous pollutants from a polluted flue gas stream of an oil or coal-fired combustion furnace, as defined above, and this apparatus, as described above, also includes a source of liquified combustible gas, i.e. natural gas, a combustible gas-fired furnace, a dust removal means for removing flue dust from the flue gas stream so as to provide a de-dusted flue gas stream, a heat recovery unit, and a compressor means for compressing the de-dusted flue gas to a pressure of at least 10 psi gauge, as set forth above in the description of the process and in connection with FIG. 1.

The apparatus also includes at least one multi-sided heat exchanger. These heat exchangers are well known in the art and need not be described herein for purposes of conciseness, and a wide variety of such heat exchangers may be used. For example, the heat exchanger(s) may be a conventional shell-and-tube heat exchangers, with or without multiple passes, two-path floating-head heat exchangers, double-pipe heat exchangers, plate and frame heat exchangers, among other such conventional heat exchangers.

The apparatus also has a first flow means for flowing the compressed flue gas and the liquified combustible gas (LNG) through the heat exchanger or exchangers, such that the compressed flue gas is first passed through one side of the heat exchanger and the liquified combustible gas is passed through and vaporized and heated in (with the exceptions noted above) another side of the heat exchanger. Such flow control means are conventional in the art and include the usual pumps, valves (usually automatic valves), controllers, diverters, expansion valves, and the like. Similarly, the second flow means of the apparatus for flowing the further flue gas (from the combustible gas-fired furnace) into the polluted flue gas stream will be similar conventional equipment, e.g. pumps, diverters, compressors, controllers, and the like.

The injecting means for injecting the vaporized combustible gas into the combustible gas-fired furnace for combustion thereof will also be conventional injection means, including fuel nozzles, control valves, automatic shut-off, throttling and metering valves, and the like.

All of the combustion gas-fired furnace, the dust removal means, the heat recovery unit, the compressor means, the injection means and the first and second flow means are conventional pieces of apparatus in the art and need not be described herein for sake of conciseness.

The only exception to this is the preference for the combustible gas-fired furnace to be a gas turbine, especially a combined cycle gas turbine, for the reasons explained above, since the gas turbine provides higher efficiency to the present invention, again, as explained above.

As optional equipment, although most preferred, as noted above, a convertor means for converting $NO_x$ to $NO_2$ and $SO_x$ to $SO_2$, and optionally for converting $CO_x$ to $CO_2$, is disposed in the polluted flue gas stream. These convertors are conventional in the art and can be of a variety of natures, including catalytic convertors (most often used), oxidation convertors, ultra-violet light convertors, CO or hydrocarbon addition convertors, and the like. Here again, these convertors are well known in the art and need not be described herein for sake of conciseness.

Figure 2A:
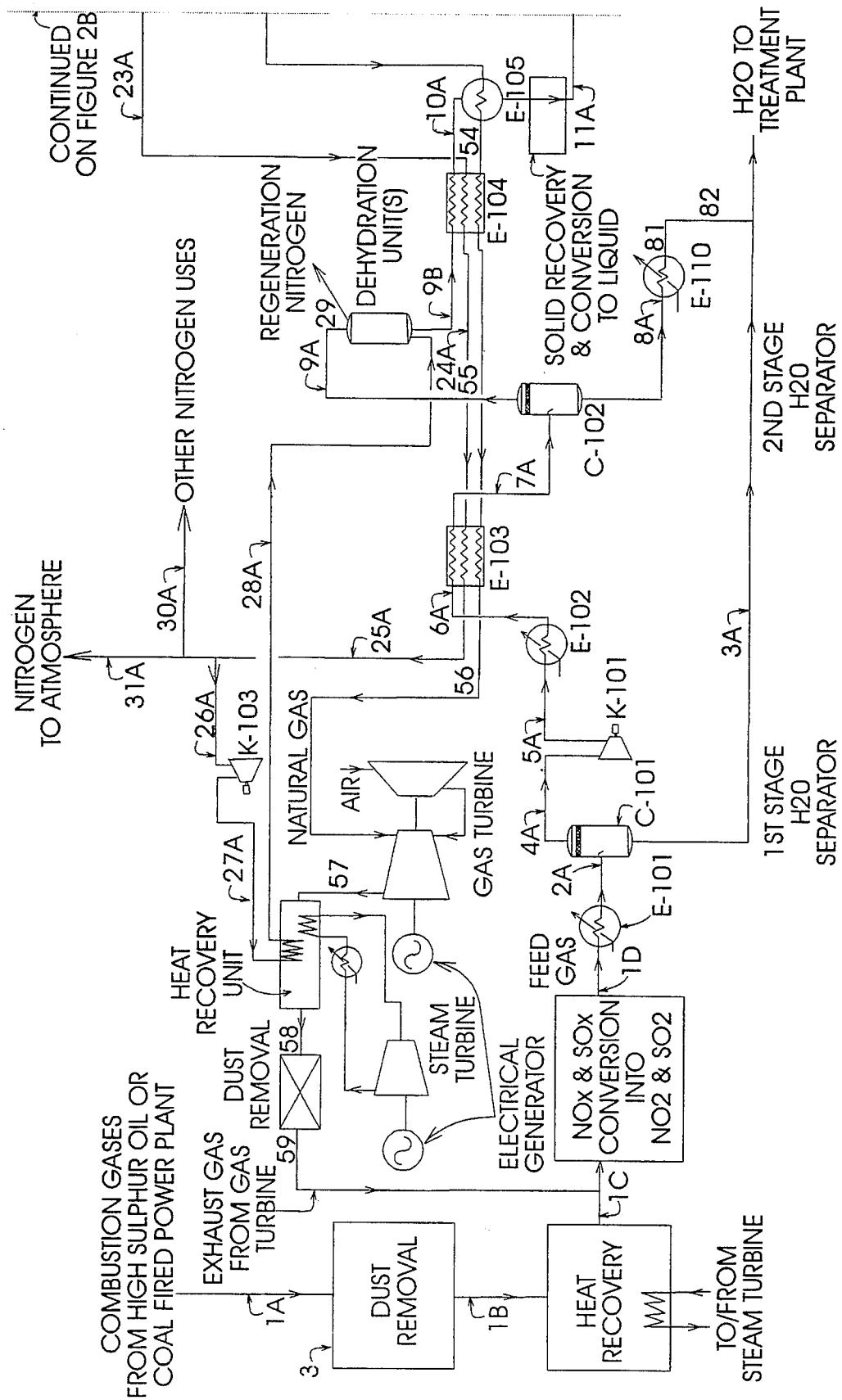
FIG. 2 is a schematic diagram, using conventional chemical engineering symbols, illustrating a specific example of the invention.
Figure 2B:
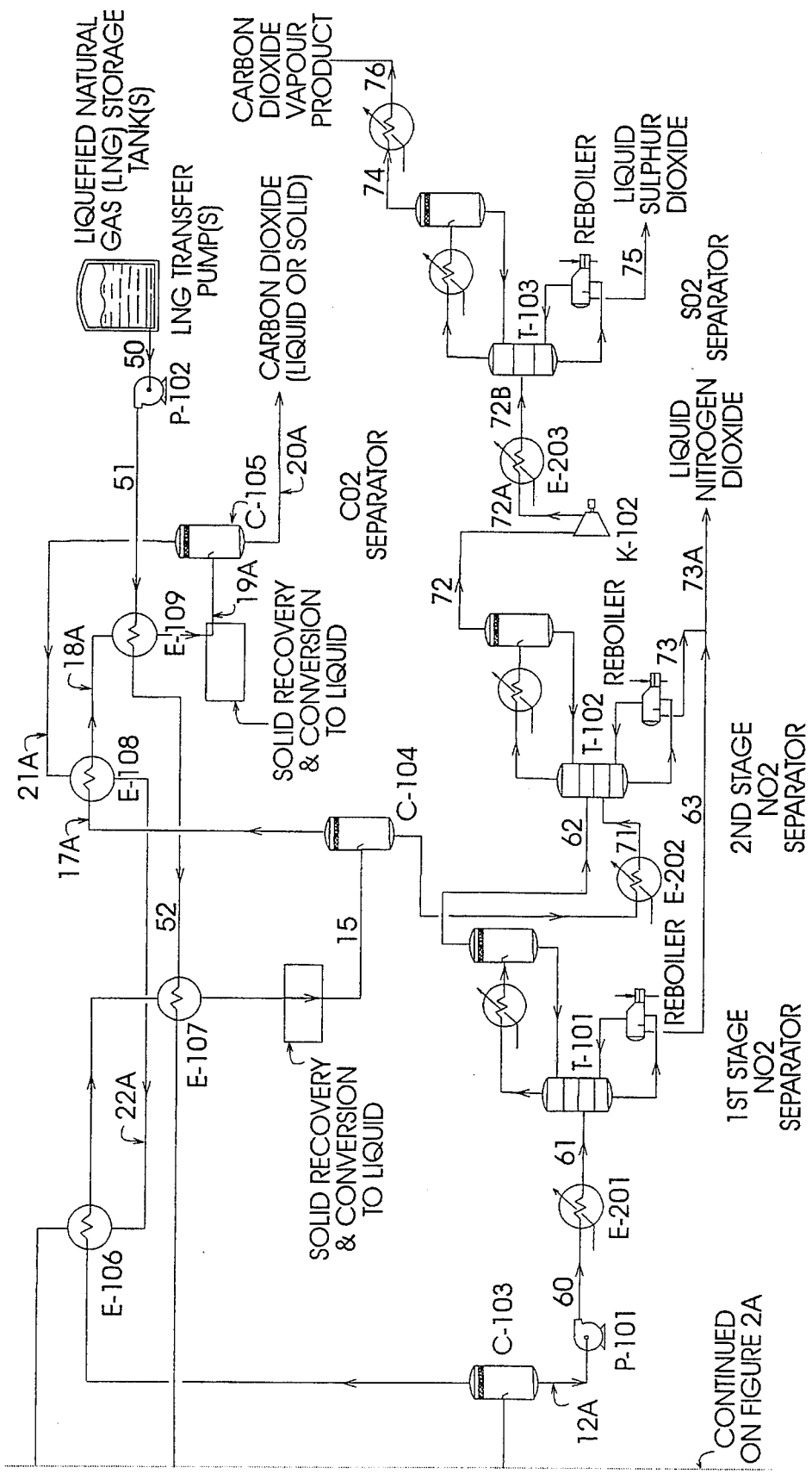

The above describes the inventive process and apparatus. However, to illustrate that process and apparatus by way of example, including more details of the conventional equipment, FIG. 2 is a conventionally displayed flow diagram of an embodiment of the process, showing in more detail the assembly of conventional processing equipment to form the present apparatus for carrying out the present process. The flow diagram uses conventional chemical engineering symbols to indicate conventional unit operations equipment.

As shown in FIG. 2, combustion gases, usually, from high sulfur oil or coal-fired power plants, are passed via line 1A to a conventional dust removal unit 3 and via line 1B to a conventional heat recovery unit, optionally coupled with a steam turbine (not shown) for producing additional power for the apparatus. The heat recovery unit can be of any of the conventional designs, but the usual heat exchanger unit is quite satisfactory.

The de-dusted flue gas is passed via line 1C to a conventional convertor where there is a conversion of $NO_x$ and $SO_x$ into $NO_2$ and $SO_2$, with optional conversion of $CO_x$ to $CO_2$. The de-dusted gas is then passed through a chiller E-101 (used as a precooler) via line 1D and into the first stage of the water ($H_2O$) separator. At this point, in view of the heat recovery, de-dusting and conversion, stream 2A will generally be at a lower temperature, e.g. 80° F. or lower, when fed into the first stage separator C-101, functioning as a water separator. The recovered water is passed via line 3A to a conventional water treatment plant, and the partially dewatered flue gas is fed via line 4A to a conventional fan or compressor K-101, which will function as a flow control means for flowing the flue gas through one side of the heat exchangers, and the pressurized flue gas is passed via line 5A to a further chiller E-102, where it is again cooled, usually to about 80° F. or lower.

The pressurized and cooled flue gas is passed via line 6A through a heat exchanger E-103 to chill the flue gas to near the freezing point of water, e.g. somewhere in the range of about 33° F. to 35° F., so that most of the residual water in the cooled flue gas pass via line 7A to separator C-102 and is removed via line 8A. The separator can be any of the conventional gas processing separators, e.g. cyclone separators and the like. Most of the energy input into the stream passing through line 8A is recovered for chilling and/or wet dehydration in a lean recycled stream, if used, or recovered in other manners, such as the use of heat exchanger E-110, which passes the recovered water via line 81 to line 82 and to the water treatment plant. The dewatered flue gas is then passed from separator C-102 via line 9A to a conventional dehydration unit which may be of the conventional wet type, such as absorption by triethylene glycol, or the dry type, such as absorption using dry desiccant, or the molecular sieve type. The particular dehydration unit is not critical and only serves to further dewater the flue gas and, hence, may be any of the conventional devices. However, when the pressure in line 5A (after the fan or compressor K-101) is relatively low, the wet absorption method is better suited, while the dry absorption method is preferred for higher pressures in line 5A.

The dehydration unit or units may be regenerated with dry nitrogen via line 28A taken from the clean effluent of line 25A, as explained in more detail below or after energy recovery of the nitrogen in the heat exchangers, a shown in FIG. 2. In this case, the nitrogen is compressed in compressor K-103 and passed via lines 27A and 28A into the dehydration unit(s). For final dehydration, that nitrogen may be heated in a gas turbine heat recovery unit, as explained more fully below. During regeneration of the dehydration unit(s), the moisture rich nitrogen is vented to the atmosphere.

The so-dehydrated flue gas is then sent via line 9B to heat exchanger E-104 where it is further cooled and then passed via line 10A to heat exchanger E-105. The moisture content will be equal to or lower than 20 parts per million, and, as can be appreciated, this is an exceptionally low moisture content, which ensures that moisture does not interfere with the subsequent separation of $NO_2$, $SO_2$, etc. When the process parameters have been adequately adjusted, e.g. stream temperature and pressure, nitrogen dioxide is condensed in heat exchanger E-105 and passed via line 11A and recovered in separator C-103. Depending upon the particular temperature and pressure, there may be solid nitrogen dioxide involved, and recovery of the solid may be achieved or, if desired, the solid can be converted to the liquid for further processing and recovery.

The recovered nitrogen dioxide is passed via line 12A to a pump P-101 and then via line 60 to a further heat exchanger E-201 and, thus, via line 61 to fractionation towers T-101 and T-102, of the conventional plate type. Conventional reboilers may be used in that separation, as shown in FIG. 2, and a recycle through heat exchangers, as noted by the symbols in FIG. 2, may also be used, although these are not normally required.

In any event, liquid or solid nitrogen dioxide is removed via lines 73 and 73A, to any suitable storage for further use or resale.

The sulfur dioxide is similarly removed, in that the flue gas from which water and $NO_2$ have been removed is passed via line 72, again, to compressor K-102, and via line 72A to heat exchanger E-203 and line 72B to fractionation tower T-103, again, with optional reboiler and heat exchanger and condenser. The liquid sulfur dioxide is passed via line 75 to any suitable storage for use or sale.

The tail gas in line 74 is small enough to discharge to the atmosphere, optionally, after recovering the energy therein by heat exchanger, as indicated by the symbol in FIG. 2, and then passed via line 76 to the atmosphere.

From $SO_2$ separator C-104 the flue gas is passed via line 17A and is cooled in heat exchanger E-108. The flue gas will now consist essentially of carbon dioxide and nitrogen. Thereafter, the flue gas is passed to heat exchanger E-109 via line 18A and via line 19A to separator C-105, which may be the same as described above, which separates liquid carbon dioxide and passed to recovery via line 20A to any conventional recovery and storage units, e.g. tanks and the like. Again, depending upon the particular conditions, the carbon dioxide may form in the solid form, and, if desired, may be converted to the liquid in a solid recovery and conversion to liquid unit, of conventional design. From separator C-105, the flue gas is passed via line 21A, and the flue gas will then consist essentially of nitrogen. That nitrogen is circulated back to cool down the flue gas passing through heat exchanger E-108, for recovery of the energy input into it during cooling, and may be also used, as indicated in FIG.

2, for coolant in heat exchanger E-106 via line 22A, as described above.

It will be noted that liquified combustible gas, indicated in FIG. 2, is liquified natural gas (LNG), and is taken from storage tank(s) via line 50 and transfer pump P-102, which functions as a flow control means for flowing combustible gas to the heat exchangers, through line 51 and into heat exchanger E-109, which is then capable of rendering the carbon dioxide in either liquid or solid form, as desired, depending upon the pressure and temperature of the compressed gas.

The substantially pure nitrogen is then passed through line 22A, through heat exchanger E-106, to line 23A, and, optionally, through heat exchanger E-104 for recovery of the energy thereof and through line 24A to heat exchanger E-103 for further heat extraction, and via line 25A to line 30A for other uses of the nitrogen that may be appropriate in the process, or via line 31A where it is discharged to the atmosphere at about ambient temperatures. In addition, that nitrogen may be passed via line 26A to compressor K-103 and via line 27A to a further heat recovery unit and back to, via line 28A, the dehydration unit, for regeneration thereof, as explained above.

It will also be noted that the liquified natural gas is transferred from the tank via line 50 and pump P-102 through line 51, heat exchanger E-109, line 52, heat exchanger E-107 and heat exchanger E-105, via line 54 to heat exchanger E-104 and via line 55 to heat exchanger E-103, for cooling, preferably in counter-current flow, as explained above. Further, as explained above, after the LNG passes through heat exchanger E-103 and is in line 56, the LNG will be completely vaporized and passed into the gas turbine as that vapor at or near ambient temperatures. The gas turbine includes means for injecting the combustible gas in that fully vaporized form (which is conventional in such furnaces) into the combustion gas-fired furnace for combustion thereof. Air, of course, is brought into the gas turbine and the fuel is combusted. The combustion gases are passed via line 57 to a heat recovery unit, which by appropriate valving thereof and/or valving in one or more lines 58 and 59 functions as a flow control means for flowing the further flue gas into the polluted flue gas, and which, optionally, heats the nitrogen, as explained above. The flue gases from that gas turbine unit pass via line 58 to a further dust removal unit, although the dust removal may be carried out in the dust removal unit from the high sulfur oil and coal-fired plant. The de-dusted gas from the turbine is passed via line 59 into the $NO_x$ and $SO_x$ convertor.

As shown in FIG. 2, the gas turbine may directly turn an electrical generator or the heat in the flue gases may be used to generate steam in the heat recovery unit, which steam, in combination with the heat recovery unit, can be used for driving the steam turbine. The gas turbine and the steam turbine may be combined to drive a single electric generator.

The nitrogen which exits heat exchanger E-103 via line 25A is of such purity, e.g. 99% pure, that it can be used in secondary processes, such as the production of ammonia by combining nitrogen and hydrogen in the presence of a catalyst, a process well known in the art.

It will also be appreciated that FIG. 1 shows separate pieces of apparatus as single units, for clarity sake, but that, most obviously, many pieces of the apparatus could be combined, e.g. combined heat exchangers, dust removal units, electrical generators, pumps, and the like. Additionally, it will be appreciated by those skilled in the art that the parameters of the process can effect differences in the conditions achieved in the process steps. For example, when the pressure in line 5A is low, then heat exchangers E-105, E-107 and E-109 may be integrated to accommodate that lower pressure. Alternatively, other mechanical or physical apparatus may be provided to accommodate that low pressure. In addition, as briefly noted above, the nitrogen dioxide, sulfur dioxide and carbon dioxide may be recovered together, when their separate recoveries are not required, and, in that event, the associated equipment with each, as described above in connection with FIG. 2, would be combined to provide a single recovery system.

Also, because of plant operations, the amount of power desired from the gas turbine may vary from time to time, and, in certain cases, where low power demand is encountered, the amount of liquified natural gas can be reduced. The number and/or size of combined cycle gas turbines is selected to give the required turndown flexibility for coal or oil-fired power plants.

As also noted above, while a gas turbine, and especially a combined cycle gas turbine, is preferred, since it will effectively use the vaporized natural gas, it will be quite obvious that the vaporized gas could be burned directly in the oil or coal-fired combustion furnace, or in a separate gas-fired boiler, thus, not requiring a gas turbine. Alternately, the vaporized natural gas may be sent to a gas distribution system, where available. In regard to the term "combined cycle turbine", this means that the steam generated from the heat recovered in the heat recovery unit placed in the exhaust of the gas turbine is used to produce electricity through either the same generator driven by the gas turbine or a separate generator. The steam cycle on the steam turbine is an established and conventional cycle.

Also, as noted above, under certain conditions, some of the recovered pollutants may be in solid form. In certain cases, it might be desirable to always recover those pollutants in solid form, and this can easily be achieved by providing suitable pressure and temperature for the compressed gas, so that the recovery of those pollutants, e.g. $SO_2$, $NO_2$ and $CO_2$, pass to the solid state and are recoverable. When this occurs, then separation can be by mechanical means, rather than the liquid gaseous separations discussed above in connection with FIG. 2. Of course, if desired, none of the pollutants need be recovered, i.e. in a saleable form, and can be simply disposed of as a contaminant in an appropriate manner. Alternately, the pollutants recovered can be used for other purposes. For example, the stream in line 19A, typically, will contain 82% nitrogen and 17% carbon dioxide. Thus, this is quite suitable for compression and sending through pipelines for simultaneously enhancing oil recovery and sequestration of carbon dioxide.

It will also be appreciated that, while FIG. 2 shows in detail specific apparatus, this apparatus is a particular combination of known pieces of apparatus, and the functions, i.e. conventional chemical engineering unit operations, and uses of those apparatus are well known to the art. Indeed, a wide variety of such known apparatus may be used in the present process and combination of specific pieces of apparatus for forming the present overall combination of apparatus. For example, the convertor may be any of the known convertors, such as those using oxygenation, ozone, ultraviolet light, injection of carbon monoxide, injection of methane, pulse corona induced plasma, electron beam, dielectric barrier discharge, etc.

Also, operation of such known pieces of apparatus is also well known to the art. For example, German Patent No. 4,231,226 describes a method for vaporizing liquified natural gas used as a fuel in electrical steam power generation plants. Briefly, the liquified natural gas is circulated through a heat exchanger system where the discharge stream is condensed and the liquified natural gas is vaporized prior to injection into the power plant boiler. This process and similar processes are in use in a number of liquified gas importing countries.

It will also be understood that the conditions, e.g. temperature, pressure, flow rates, etc., will be according to usual chemical engineering practices. For example, the temperature in heat exchangers will depend upon the pressure of the flue gas, and the pressure of the flue gas, in part, will depend upon the flow rates used. The heat exchange in the heat exchangers, similarly, will depend upon the size and type of heat exchangers used, as well as the efficiency thereof. These parameters are easily obtained by standard chemical engineering calculations for a particular flue gas and a particular liquified combustible gas. In this latter regard, while any refrigerated liquified combustible gas may be theoretically used, liquified natural gas has been illustrated above, since this is the most practical liquified combustible gas. The temperatures usually obtained by such liquified combustible gases will be at least −50° F., more usually less than −100° F., and more preferably less than −200° F.

Figure 3:
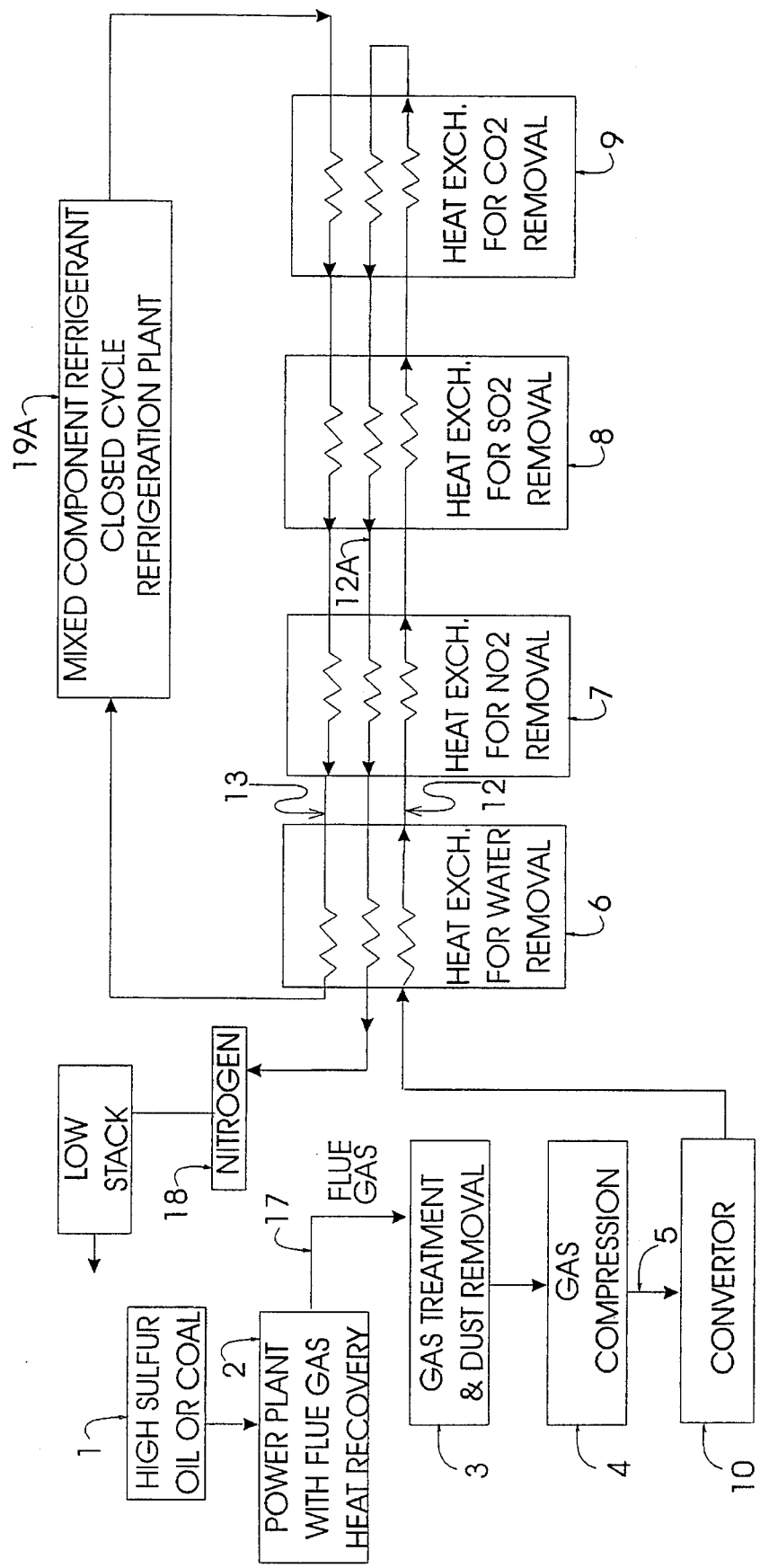
FIG. 3 shows a modification of the basic steps shown in FIG. 1.

FIG. 3 shows a modification of the overall process and apparatus of FIG. 1. From a comparison of FIGS. 1 and 3, which use the same drawing numerals for the same steps and apparatus, it will be seen that the liquified natural gas storage 11, the combined cycle gas turbine 14, generator 15, further flue gas 16, and refrigeration 19 (FIG. 1) have been eliminated and replaced by the mixed component refrigerant closed cycle refrigeration plant 19A (FIG. 3). In a broad sense, refrigeration plant 19A (FIG. 3) serves the purpose of the liquified natural gas of FIG. 1. The mixed components refrigerant of refrigeration plant 19A may be the same as the combustible gases of FIG. 1, e.g. methane, ethane, propane, butane, pentane, etc. or may be or include other refrigerants such as the nitrogen recovered from the process as disclosed above, or environment-friendly refrigerants such as R23 or R125. The closed cycle refrigeration plant 19A can be of any conventional design, e.g. use of compressors, fans, absorption, etc. for the closed refrigeration cycle, and the closed cycle refrigeration plant 19A carries out the same function as described above in connection with FIG. 1 with regard to the vaporization of the combustible gas for cooling purposes.

The arrangement of FIG. 3 may be used when the supply of combustible gas, e.g. liquified natural gas, as described in connection with FIG. 1, is interrupted or not available or not available in sufficient quantity so as to provide the required cooling for the arrangement of FIG. 1. This is, of course, the same purpose as the refrigeration 19 of FIG. 1, but in FIG. 3, the refrigeration plant 19A is shown as capable of performing the entire required cooling operation, as opposed to refrigeration 19 of FIG. 1, which is shown as supplemental cooling to the cooling of the natural gas.

When the mixed component refrigerant of refrigeration plant 19A is a combustible gas, such as those noted above, the combustible gas may be recycled in the closed cycle refrigeration plant 19A, when required for cooling purposes, rather than being sent to the combined cycle gas turbine of FIG. 1; or, when the supply of combustible gas is only partially insufficient, part of the combustible gas can be recycled in the closed cycle refrigeration plant 19A and part can be sent to the combined cycle gas turbine of FIG. 1; or, when the combustible gas is fully sufficient for required cooling, the refrigeration plant 19A may not be used and all of the combustible gas is sent to the combined cycle gas turbine 14 of FIG. 1. Thus, within the scope of the invention, the process and apparatus used may vary from that shown in FIG. 1 to that shown in FIG. 3 or between these two situations.

Thus, in summary, the present invention provides a practical solution to the problems faced by conventional wet or dry scrubbing techniques for removing pollutants from flue gas. The invention is applicable to a wide variety of stack emissions from a wide variety of plants, including power plants and equipment, chemical plants, processing plants, and the like. The invention also eliminates or reduces significantly the refrigeration power and related plant capital equipment associates with cryogenic operation, as well as avoids the need for separate vaporization plant equipment for liquified natural gas and associated utilities. With the present invention, a "low" stack, as opposed to a "high" stack, may be used, which is a decided economic advantage, and the emissions released into the atmosphere are non-polluting and, moreover, may otherwise be used for other processes, e.g. the recovery of oil from depleted oil fields and the production of other compounds, such as reactions with nitrogen and carbon dioxide. Also, the invention is applicable to mobile facilities, such as ferries, cargo vessels, and the like using stand alone refrigeration equipment.

The use of the flue gas as a heating medium eliminates any loss of energy by vaporization of the liquified natural gas, and, therefore, minimal energy penalties are encountered in reaching the temperatures necessary for cryogenic condensation or freezing of the pollutants.

The process can also provide valuable by-products, such as 99.5% pure nitrogen dioxide and sulfur dioxide, which are suitable for industrial and commercial use, and 95.5% or better purity carbon dioxide can be easily produced in either liquid or solid form for commercial and industrial use.

In the above description, as well as in the annexed claims, all percentages and parts are by weight unless otherwise indicated.

Having described the invention, it will be apparent to those skilled in the art that many variations and modifications thereof are obvious, and it is intended that those obvious variations and modifications be embraced by the spirit and scope of the annexed claims.

What is claimed is:

1. A method for removing gaseous pollutants from a polluted flue gas stream of an oil or coal-fired combustion furnace, comprising:

(A) providing a source of liquified combustible gas;

(B) providing a combustible gas-fired furnace;

(C) passing the polluted flue gas stream through a dust removal means and removing flue dust from the flue gas stream so as to provide a de-dusted flue gas stream;

(D) recovering heat from the flue gas to generate power therefrom;

(E) compressing the de-dusted flue gas to a pressure of at least 10 psi gauge using the generated power to at least in part compress the de-dusted flue gas;

(F) passing the compressed flue gas and the combustible gas through at least one multi-sided heat exchanger, wherein the compressed flue gas is first passed through one side thereof and the liquified combustible gas in an at least partially vaporized state is passed through another side thereof, and wherein the compressed flue gas is cooled sufficiently by the combustible gas that water and at least one gaseous pollutant selected from the group consisting of $NO_2$, $SO_2$ and $CO_2$ are condensed and separated from the compressed flue gas to provide reduced pollutant flue gas; and (G) passing fully vaporized combustible gas to the combustible gas-fired furnace and combusting the gas to a further flue gas and passing the further flue gas into the polluted flue gas stream.

2. The method of claim 1, wherein the liquified combustible gas is liquified natural gas.

3. The method of claim 1, wherein the combustible gas-fired furnace is a gas turbine.

4. The method of claim 3, wherein the gas turbine is a combined cycle gas turbine.

5. The method of claim 1, wherein the dust removal means is at least one of a cyclone separator, a Contrell precipitator, a wet scrubber and a dry scrubber.

6. The method of claim 1, wherein the de-dusted flue gas is compressed to a pressure of up to 400 psi gauge.

7. The method of claim 6, wherein the pressure is between 20 and 150 psi gauge.

8. The method of claim 7, wherein the pressure is between 30 and 100 psi gauge.

9. The method of claim 1, wherein a first passed compressed flue gas and the liquified combustible gas are passed through the at least one heat exchanger in counter-current flow directions.

10. The method of claim 9, wherein there are a plurality of heat exchangers in series, and a first of the heat exchangers condenses and removes water from the compressed gas.

11. The method of claim 10, wherein a second heat exchanger condenses and removes $NO_2$ from the compressed gas.

12. The method of claim 11, wherein a third heat exchanger condenses and removes $SO_2$ from the compressed gas.

13. The method of claim 12, wherein a fourth heat exchanger condenses and removes $CO_2$ from the compressed gas.

14. The method of claim 10, wherein the flue gas passing through a last of the plurality of heat exchangers is recycled through a further side of the heat exchangers in a counter-current flow with the first passed compressed gas to recover heat therefrom.

15. The method of claim 9, wherein the compressed gas which exits a last of the plurality of heat exchangers to contact the compressed gas is substantially only nitrogen gas at ambient temperatures.

16. The method of claim 1, wherein the oil is fuel oil or bunker oil or shale oil or mixtures thereof.

17. The method of claim 10, wherein the liquified combustible gas is completely vaporized while passing through the plurality of heat exchangers.

18. The method of claim 10, wherein the compressed gas exiting from a last of the plurality of heat exchangers contacted by the compressed gas is passed to the atmosphere through a low flue stack.

19. The method of claim 18, wherein the low flue stack is less than 100 feet high.

20. The method of claim 1, wherein the removed $NO_2$, $SO_2$ and $CO_2$ are recovered.

21. The method of claim 1, wherein the polluted flue gas stream is first passed through a $NO_x$ to $NO_2$ and $SO_x$ to $SO_2$ convertor.

22. The method of claim 1, wherein the compressed gas is further cooled by open or closed cycle refrigeration prior to or during passage through the at least one heat exchanger.

23. Apparatus for removing gaseous pollutants from a polluted flue gas stream of an oil or coal-fired combustion furnace, comprising:

(A) a source of liquified combustion gas;

(B) a combustible gas-fired furnace;

(C) dust removal means for removing flue dust from the flue gas stream so as to provide a de-dusted flue gas stream;

(D) a heat recovery unit for recovering heat from the flue gas to generate power therefrom;

(E) a compressor means for compressing the de-dusted flue gas to a pressure of at least 10 psi gauge using power generated by the heat recovery unit to at least in part compress the de-dusted flue gas;

(F) at least one multi-sided heat exchanger;

(G) first flow means for flowing compressed flue gas and liquified combustible gas in an at least partially vaporized state through the heat exchanger such that the compressed flue gas is first passed through one side of the heat exchanger and the liquified combustible gas is passed in counter-current flow through and at least partially vaporized in another side of the heat exchanger, such that the compressed flue gas is cooled sufficiently by the vaporized or vaporizing combustible gas that water and at least one gaseous pollutant selected from the group consisting of $NO_2$, $SO_2$ and $CO_2$ are condensed and separated from the compressed flue gas to provide reduced pollutant flue gas;

(H) injection means for injecting the combustible gas in fully vaporized form into the combustion gas-fired furnace for combustion thereof to a further flue gas; and (I) second flow means for flowing the further flue gas into the polluted flue gas stream.

24. The apparatus of claim 23, wherein the liquified combustible gas is liquified natural gas.

25. The apparatus of claim 23, wherein the combustible gas-fired furnace is a gas turbine.

26. The apparatus of claim 25, wherein the gas turbine is a combined cycle gas turbine.

27. The apparatus of claim 23, wherein the dust removal means is at least one of a cyclone separator, a Contrell precipitator, a wet scrubber and a dry scrubber.

28. The apparatus of claim 23, wherein the compressor is capable of compressing the de-dusted flue gas to a pressure of up to 400 psi gauge.

29. The apparatus of claim 28, wherein the pressure is between 20 and 150 psi gauge.

30. The apparatus of claim 29, wherein the pressure is between 30 and 100 psi gauge.

31. The apparatus of claim 23, wherein the first flow means flows the compressed flue gas and the liquified combustible gas through the at least one heat exchanger in counter-current flow directions.

32. The apparatus of claim 23, wherein there are a plurality of heat exchangers in series, and a first of the heat exchangers is capable of condensing and removing water from the compressed gas.

33. The apparatus of claim 32, wherein a second heat exchanger is capable of condensing and removing $NO_2$ from the compressed gas.

34. The apparatus of claim 33, wherein a third heat exchanger is capable of condensing and removing $SO_2$ from the compressed gas.

35. The apparatus of claim 34, wherein a fourth heat exchanger is capable of condensing and removing $CO_2$ from the compressed gas.

36. The apparatus of claim 32, wherein the first flow means flows the flue gas passing through a last of the plurality of heat exchangers such that the flue gas is recycled through a further side of the heat exchangers in a counter-current flow with the first passed compressed gas.

37. The apparatus of claim 32, wherein the first flow means flow the liquified combustible gas such that the combustible gas is completely vaporized while passing through the plurality of heat exchangers.

38. The apparatus of claim 32, wherein the first flow means flows the compressed gas exiting from a last of the plurality of heat exchangers to the atmosphere through a low flue stack.

39. The apparatus of claim 38, wherein the low flue stack is less than 100 feet high.

40. The apparatus of claim 32, including recovery means for recovering the removed $NO_2$, $SO_2$ and $CO_2$.

41. The apparatus of claim 23, including convertor means for converting $NO_x$ to $NO_2$ and $SO_x$ to $SO_2$ disposed in the polluted flue gas stream.

42. The apparatus of claim 23, further including an open or closed cycle refrigeration means disposed such that the compressed gas is further cooled prior to or during passage through the at least one heat exchanger.

* * * * *